United States Patent [19]

Yamamoto et al.

[11] Patent Number: 4,731,295

[45] Date of Patent: Mar. 15, 1988

[54] COATING COMPOSITION FOR CONTROLLING HYDROGEN ABSORPTION

[75] Inventors: Takashi Yamamoto, Souraku; Toshihiro Okai, Katano; Mitsuyuki Oda, Kyoto, all of Japan

[73] Assignee: Nippon Paint Co., Ltd., Osaka, Japan

[21] Appl. No.: 881,581

[22] Filed: Jul. 2, 1986

Related U.S. Application Data

[63] Continuation-in-part of Ser. No. 663,451, Oct. 22, 1984, abandoned.

[30] Foreign Application Priority Data

Oct. 22, 1983 [JP] Japan .................................. 58-198022
Oct. 29, 1983 [JP] Japan .................................. 58-203362
Feb. 9, 1984 [JP] Japan .................................. 59-23873

[51] Int. Cl.$^4$ ............................................. B32B 11/00
[52] U.S. Cl. ................................. 428/472; 428/450; 428/458
[58] Field of Search ........................................ 324/413

[56] References Cited

U.S. PATENT DOCUMENTS 3,474,301 10/1969 Shohji et al. ...................... 317/234
3,594,339 7/1971 Palaika .............................. 524/413
3,956,231 5/1976 Moore et al. ...................... 524/406
4,407,899 10/1983 Hara et al. ........................ 428/629

FOREIGN PATENT DOCUMENTS 1344512 1/1974 United Kingdom .

Primary Examiner—Theodore Morris
Attorney, Agent, or Firm—Wenderoth, Lind & Ponack

[57] ABSTRACT

There is herein provided a coating composition for controlling hydrogen embrittlement of a steel which contains 1 to 500 percent by weight of a metal oxide selected from the group consisting of manganese dioxide, vanadium pentoxide and molybdenum trioxide based on 100 percent by weight of resin solids.

1 Claim, 5 Drawing Figures

COATING COMPOSITION FOR CONTROLLING HYDROGEN ABSORPTION

This application is a continuation-in-part of now abandoned application Ser. No. 663,451, filed Oct. 22, 1984, now abandoned.

FIELD OF THE INVENTION

The present invention relates to a coating composition for controlling hydrogen absorption of a steel, more particularly, a coating composition for preventing hydrogen embrittlement cracking which is the hydrogen induced cracking arising from the absorbed hydrogen atoms into the steel, formed by corrosion of the steel.

BACKGROUND OF THE INVENTION

A steel produces a stress corrosion cracking in the presence of hydrogen sulfide or carbonic acid gas. It is believed that a part of hydrogen formed from a reaction of hydrogen sulfide with the steel is absorbed and diffused into the steel in the form of the atomic state to result in the hydrogen embrittlement cracking.

In order to prevent the hydrogen embrittlement, a coating or a lining has been used, by which corrosive reagents such as hydrogen sulfide are prevented from contacting the steel. Typical examples are the method of adding a metallic powder (pigment) reactive with hydrogen sulfide to a coating composition and the method of adding an ion-exchange resin to a coating composition. The former prevents contact between hydrogen sulfide and the surface of the steel by the reaction of hydrogen sulfide with the metallic powder. The latter prevents contact between hydrogen sulfide and the surface of the steel by the reaction of hydrogen sulfide with the ion-exchange resin.

The above methods are based on the reaction of hydrogen sulfide with the additive such as the pigment or the ion-exchange resin. The reaction, however, can not continue forever, that is, the technical effect of the additive would reduce rapidly and the corrosion reaction would begin to increase if the reactivity of the additive decreases. According to the above methods, the corrosion reaction generally begins to increase after 30 hours to 100 days from an application of the coating composition. This term falls short of the actual service life of the steel (50–60 years).

SUMMARY OF THE INVENTION

The present invention provides a coating composition for controlling a hydrogen absorption which contains 1 to 500 percent by weight of a metal oxide selected from the group consisting of manganese dioxide, vanadium pentoxide and molybdenum trioxide based on 100 percent by weight of resin solids.

DETAILED DESCRIPTION OF THE INVENTION

Figure 1:
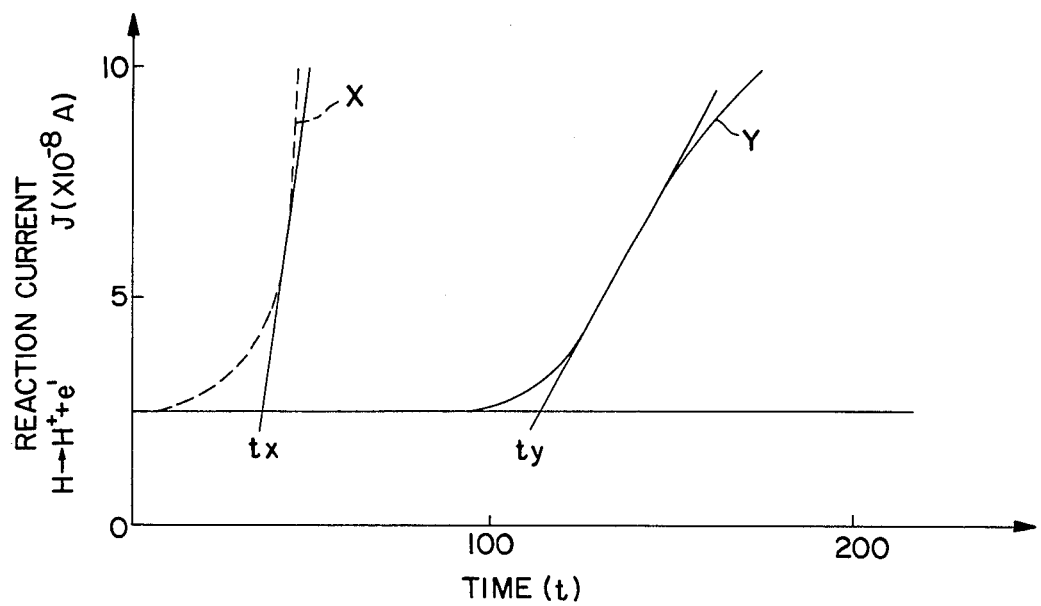
FIG. 1 shows change with time of reaction current to extraction of hydrogen.

Examples of manganese dioxide are natural manganese dioxide, electrolytic manganese dioxide, chemical synthesis manganese dioxide and a mixture thereof. Electrolytic manganese dioxide is generally prepared by an electrolysis of manganese sulfate or manganese chloride. Chemical manganese dioxide is prepared by a decomposition of a permanganate with hydrochloric acid, an oxidation of manganese sulfate or a thermal decomposition of manganese nitrate.

Vanadium pentoxide can be prepared by any conventional method such as the baking of lower oxides, nitrides or sulfides of vanadium.

Molybdenum trioxide can be prepared by any conventional method such as baking in air or a reaction with nitric acid of molybdenum metals, or lower oxides or sulfide of molybdenum metals. Also heating of phosphorus molybdate or heating of ammonium molybdate with nitric acid can be employed.

The particle size of the metal oxide is the same as a pigment. A bigger particle size gives insufficient film properties.

The vehicle used in the present invention is generally for a coating or a lining, for example a polymerized oil, a natural or synthetic resin, or a mixture thereof.

A typical example of the polymerized oil is the boiled oil. Examples of the natural or synthetic resin are an epoxy resin, an epoxy-urethane resin, an epoxy coal tar resin, a melamine resin, a rubber chloride, a phenol resin, a polyester resin, a polyurethane resin, a silicon resin, a fluororesin, and the like.

According to the present invention, the metal oxide is formulated into the coating composition in an amount of 1 to 500 percent by weight, preferably 5 to 100 percent by weight based on 100 percent by weight of resin solids. Amounts of more than 500 percent by weight are undesirable because of insufficient film properties. Amounts less than 1 percent by weight are undesirable because the technical effect of the present invention cannot be provided.

To the coating composition of the present invention is added water or another solvent to form a dispersion. Examples of solvents are those used in the usual coatings such as ketones, esters, glycols, alcohols, hydrocarbons. Also conventional type pigments or other additives can be added to the coating composition of the present invention, Examples of the additives are a plasticizer, a surfactant, a drying agent, a curing agent, a thickener, an anti-sagging agent, and the like.

The steel to be treated by the coating composition of the present invention is one which can form or easily forms stress corrosion, hydrogen embrittlement, hydrogen induced cracking, hydrogen blisters and the like. Typical examples of the steel are carbon steel, alloys, high tensile strength steel and the like which are used for oil field pipes, transfer line pipes, bolts, assembly of a ship and the like.

The process for coating can be any conventional process such as flow, dipping, spray, brush, or powder coating.

The substrate coated by the coating composition of the present invention hardly absorbs the atomic state hydrogen formed by the corrosion of the steel under the atmosphere containing hydrogen sulfate. Accordingly, the coating composition of the present invention effectively controls the hydrogen embrittlement. It is believed that the reason why the present coating composition prevents the hydrogen embrittlement is that the corrosion potential of the steel surface is kept noble by the metal oxide of the present invention (the absorption of the atomic state hydrogen would be accelerated if the corrosion potential of the steel surface is a less-noble potential).

The present invention is illustrated by the following examples, which, however, are not to be construed as limiting the invention to their details. All parts and percentages in the examples are by weight unless otherwise specified.

EXAMPLE I

A paint was prepared by the formulation as shown in Table-1 and was applied to a cold rolled steel (thickness 0.8 mm, JIS G 3141) under the condition as shown in Table-1. Instead of the cold rolled steel, the use of a high tensile steel is naturally required for an evaluation of the hydrogen embrittlement crack, but since the technical effect of the present invention can be evaluated by the degree of the hydrogen absorption is the steel, the cold rolled steel was used in the present example. The method of coating was a spray coating.

For the purpose of comparison, a paint was prepared by using the formulation outside the range of the present invention in the amount of manganese dioxide and was applied to the cold rolled steel.

In order to evaluate the controlling property of hydrogen absorption, a change on standing of the current caused by the reaction, $H \rightarrow H^+ + e^-$, which is an extract reaction of hydrogen on the other side of the steel, was measured. The measuring process was based on the method described in Japanese Pat. No. 1018241, the portions of which are hereby incorporated by reference.

The method of the evaluation is illustrated with referring to FIG. 1. The curve X of FIG. 1 shows a change on standing of a reaction current to an extract of hydrogen with using the paint not containing manganase dioxide of the present invention, and the curve Y of FIG. 1 shows a change of standing of a reaction current to an extract of hydrogen with using the paint described in this example. Increase of the reaction current shows that the hydrogen was absorbed into the steel by a corrosion reaction of the steel surface under the film is extracted from the opposite side of the steel. Accordingly, the latter build up time of a curve shows the better corrosion control property. In FIG. 1, tx or ty indicates the build up time. The rate of this build up times between the curve X and the curve Y, i.e. ty/tx can indicate the technical effect of the present invention. The result and the condition of the corrosion is shown in Table 1.

TABLE 1

| Example number | name of paint | a type of manganese dioxide and loading (parts) based on resin solids 100 parts | drying condition | thickness of film (μm) | ty/tx ratio | corrosion condition |
|---|---|---|---|---|---|---|
| 1 | SUPERLAC DIF, F-80, N-23 (epoxy polyurethan paint) | natural manganese dioxide[1] 100 parts | 190° C./10 sec. | 20 | 160 | Hydrogen sulfide and carbonic acid were continuously blown into 3% NaCl solution. Temp. 50° C. |
| 2 | COPON MASTIC PRIMER (epoxy resin paint) | natural manganese dioxide 100 parts | natural drying 10 days | 70 | 72 | Hydrogen sulfide and carbonic acid were continuously blown into 3% NaCl solution. Temp. 70° C. |
| 3 | EPOTAR S (JIS K-566) (epoxy coal tar paint) | natural manganese dioxide 100 parts | natural drying 10 days | 40 | 21 | Hydrogen sulfide and carbonic acid were continuously blown into 3% NaCl solution. Temp. 50° C. |
| 4 | Hi-RUBBER E PRIMER (rubber chloride paint) | natural manganese dioxide 100 parts | natural drying 10 days | 25 | 15 | Hydrogen sulfide and carbonic acid were continuously blown into 3% NaCl solution. Temp. 30° C. |
| 5 | SULPHOTITE 10 (phenol resin paint) | natural manganese dioxide 100 parts | natural drying 10 days | 25 | 120 | Hydrogen sulfide gas of 100% relative humidity. Temp. 70° C. |
| 6 | SUNFTAL (JIS K-5572) (phthalic acid paint) | natural manganese dioxide 100 parts | natural drying 10 days | 25 | 78 | Hydrogen sulfide gas of 100% relative humidity. Temp. 70° C. |
| 7 | ORGA 100-2 (melamine resin paint) | natural manganese dioxide 100 parts | natural drying 10 days | 20 | 34 | Hydrogen sulfide gas of 100% relative humidity. Temp. 30° C. |
| 8 | CYANAMID HELGON QD (JIS K5625-2) | natural manganese dioxide 100 parts | natural drying 10 days | 35 | 23 | Hydrogen sulfide and carbonic acid were continuously blown into 3% NaCl solution. Temp. 30° C. |
| 9 | INTERGARD GLASS FLAKE (epoxy resin paint) | natural manganese dioxide 100 parts | natural drying 10 days | 2000 | 15 | Hydrogen sulfide was continuously blown into 3% NaCl solution. Temp. 60° C. |
| 10 | NIPPE ZINKY 1000P (zinc powder containing paint) | natural manganese dioxide 100 parts | natural drying 10 days | 20 | 25 | Hydrogen sulfide was continuously blown into 3% NaCl |

TABLE 1-continued

| Example number | name of paint | a type of manganese dioxide and loading (parts) based on resin solids 100 parts | drying condition | thickness of film (μm) | ty/tx ratio | corrosion condition |
|---|---|---|---|---|---|---|
| 11 | Hi-CR PRIMER WHITE (JIS K-5506) (synthetic resin paint) | natural manganese dioxide 100 parts | natural drying 10 days | 20 | 95 | Hydrogen sulfide was continuously blown into 3% NaCl solution. Temp. 20° C. |
| 12 | POWDAX P (powder coating) | natural manganese dioxide + electrolytic manganese dioxide[(2)] 100 parts | 180° C./30 min. | 100 | 17 | Hydrogen sulfide and carbonic acid were continuously blown into 3% NaCl solution. Temp. 50° C. |
| 13 | ORGA 100-2 (melamine resin paint) | electrolytic manganese dioxide 10 parts | natural drying 10 days | 20 | 105 | Hydrogen sulfide was continuously blown into 3% NaCl solution. Temp. 70° C. |
| 14 | ORGA 100-2 (melamine resin paint) | synthetic manganese dioxide[(3)] 10 parts | natural drying 10 days | 20 | 175 | Hydrogen sulfide was continuously blown into 3% NaCl solution. Temp. 40° C. |
| 15 | Hi-CR PRIMER WHITE (JIS K-5506) (synthetic resin paint) | synthetic manganese dioxide[(4)] 1 parts | natural drying more than 10 days | 10 | 43 | Hydrogen sulfide of 100% relative humidity. Temp. 60° C. |
| 16 | Hi-CR PRIMER WHITE (JIS K-5506) (synthetic resin paint) | synthetic manganese dioxide 10 parts | natural drying more than 10 days | 10 | 120 | Hydrogen sulfide gas of 100% relative humidity. Temp. 60° C. |
| 17 | Hi-CR PRIMER WHITE (JIS K-5506) (synthetic resin paint) | synthetic manganese dioxide 100 parts | natural drying more than 10 days | 10 | 32 | Hydrogen sulfide gas of 100% relative humidity. Temp. 60° C. |
| 18 | Hi-CR PRIMER WHITE (JIS K-5506) (synthetic resin paint) | synthetic manganese dioxide 500 parts | natural drying more than 10 days | 10 | 14 | Hydrogen sulfide gas of 100% relative humidity. Temp. 60° C. |
| Comparative Example 1 | Hi-CR PRIMER WHITE (JIS K-5506) (synthetic resin paint) | synthetic manganese dioxide 0.1 parts | natural drying more than 10 days | 10 | 3 | Hydrogen sulfide gas of 100% relative humidity. Temp. 60° C. |
| Comparative Example 2 | Hi-CR PRIMER WHITE (JIS K-5506) (synthetic resin paint) | synthetic manganese dioxide 1000 parts | natural drying more than 10 days | 10 | 2 | Hydrogen sulfide gas of 100% relative humidity. Temp. 60° C. |

[(1)]Use of $\beta$ - $MnO_2$ type pyrolusite
[(2)]$\gamma$ - $MnO_2$
[(3)]$\alpha$ - $MnO_2$
[(4)]$\beta$ - $MnO_2$ Since this measurement is conducted by an electrochemical method, it is 100 times more sensitive than a conventional gas measurement. Accordingly, measuring time of ty is stopped at 1,000 hours, and ty is regarded as 1,000 unless the ty point is observed.

In Table 1, ty/tx of Example 9 was as small as 15, Example 9, however, was seemingly small, because it was a thick coating type (a kind of lining) which made ty more than 1,000 hours. Accordingly it seems that the technical effect is more than 15 times greater when manganese dioxide is present in the paint.

EXAMPLE II

A paint was prepared by the formulation as showed in Table-2 and was applied to a cold rolled steel (thickness 0.8 mm, JIS G 3141) under the condition as shown in Table-2.

For the purpose of comparison, a paint was prepared by using the formulation outside the range of the present invention in the amount of vanadium pentoxide and was applied to the cold rolled steel.

An evaluation was conducted as generally described in Example I. The result is shown in Table 2.

TABLE 2

| Example number | name of paint | loading of vanadium pentoxide (parts) based on resin solids 100 parts | drying condition | thickness of film (μm) | ty/tx ratio | corrosion condition |
|---|---|---|---|---|---|---|
| 19 | SUPERLAC DIF, F-80, N-23 (epoxy polyurethan paint) | 30 parts | 190° C./10 sec. | 20 | 310 | Hydrogen sulfide and carbonic acid were continuously blown into 3% NaCl solution. Temp. 50° C. |
| 20 | COPON MASTIC PRIMER (epoxy resin paint) | 30 parts | natural drying 10 days | 60 | 250 | Hydrogen sulfide and carbonic acid were continuously blown into 3% NaCl solution. Temp. 70° C. |
| 21 | EPOTAR S (epoxy coal tar paint) | 30 parts | natural drying 10 days | 70 | 41 | Hydrogen sulfide and carbonic acid were continuously blown into 3% NaCl solution. Temp. 50° C. |
| 22 | Hi-RUBBER E PRIMER (rubber chloride paint) | 30 parts | natural drying 10 days | 40 | 29 | Hydrogen sulfide and carbonic acid were continuously blown into 3% NaCl solution. Temp. 30° C. |
| 23 | SUPHOTITE 10 (phenol resin paint) | 30 parts | natural drying 10 days | 25 | 270 | Hydrogen sulfide gas of 100% relative humidity. Temp. 70° C. |
| 24 | SUNFTAL 20 (JIS K-5572) (phthalic acid paint) | 30 parts | natural drying 10 days | 25 | 80 | Hydrogen sulfide gas of 100% relative humidity. Temp. 70° C. |
| 25 | ORGA 100-2 (melamine resin paint) | 30 parts | natural drying 10 days | 20 | 50 | Hydrogen sulfide gas of 100% relative humidity. Temp. 30° C. |
| 26 | CYANAMID HELGON QD PRIMER (JIS K5625-2) | 30 parts | natural drying 10 days | 35 | 49 | Hydrogen sulfide and carbonic acid were continuously blown into 3% NaCl solution. Temp. 30° C. |
| 27 | INTERGARD GLASS FLAKE (epoxy resin paint) | 30 parts | natural drying 10 days | 2000 | 38 | Hydrogen sulfide was continuously blown into 3% NaCl solution. Temp. 60° C. |
| 28 | NIPPE ZINKY 1000P (zinc powder containing paint) | 30 parts | natural drying 10 days | 20 | 90 | Hydrogen sulfide was continuously blown into 3% NaCl solution. Temp. 20° C. |
| 29 | Hi-CR PRIMER WHITE (JIS K-5506) (synthetic resin paint) | 30 parts | natural drying 10 days | 20 | 152 | Hydrogen sulfide was continuously blown into 3% NaCl solution. Temp. 40° C. |
| 30 | POWDAX P (powder coating) | 30 parts | 180° C./30 min. | 100 | 31 | Hydrogen sulfide and carbonic acid were continuously blown into 3% NaCl solution. Temp. 70° C. |
| 31 | Hi-CR PRIMER WHITE (JIS K-5506) (synthetic resin paint) | 1 parts | natural drying more than 10 days | 10 | 81 | Hydrogen sulfide was continuously blown into 3% NaCl solution. Temp. 40° C. |
| 32 | Hi-CR PRIMER WHITE (JIS K-5506) (synthetic resin paint) | 10 parts | natural drying more than 10 days | 10 | 370 | Hydrogen sulfide was continuously blown into 3% NaCl solution. Temp. 40° C. |
| 33 | Hi-CR PRIMER WHITE (JIS K-5506) (synthetic resin paint) | 100 parts | natural drying more than 10 days | 10 | 102 | Hydrogen sulfide of 100% relative humidity. Temp. 60° C. |
| 34 | Hi-CR PRIMER WHITE (JIS K-5506) (synthetic resin paint) | 500 parts | natural drying more than 10 days | 10 | 21 | Hydrogen sulfide gas of 100% relative humidity. Temp. 60° C. |
| Comparative Example 3 | Hi-CR PRIMER WHITE (JIS K-5506) (synthetic resin paint) | 0.1 parts | natural drying more than 10 days | 10 | 7 | Hydrogen sulfide gas of 100% relative humidity. Temp. 60° C. |
| Comparative Example 4 | Hi-CR PRIMER WHITE (JIS K-5506) (synthetic resin paint) | 1000 parts | natural drying more than 10 days | 10 | 5 | Hydrogen sulfide gas of 100% relative humidity. Temp. 60° C. |

Since this measurement is conducted by an electrochemical method, it is 100 times more sensitive than a conventional gas measurement. Accordingly, the measuring time of ty is stopped at 3,000 hours, ty is regarded as 3,000 unless the ty point exists.

In Table 2, ty/tx of Example 27 was as small as 38, Example 27, however, was seemingly small, because it was a thick coating type (a kind of lining) which made ty more than 3,000 hours. Accordingly it seems that the technical effect is more than 38 times greater when vanadium pentoxide is present in the paint.

EXAMPLE III

A paint was prepared by the formulation as showed in Table-3 and was applied to a cold rolled steel (thickness 0.8 mm, JIS G 3141) under the condition as shown in Table-3.

For the purpose of comparison, a paint was prepared by using the formulation outside the range of the present invention in the amount of molybdenum trioxide and was applied to the cold rolled steel.

An evaluation was conducted as generally described in Example I. The result is shown in Table 3.

TABLE 3

| Example number | name of paint | loading or molybdenum trioxide (parts) based on resin solids 100 parts | drying condition | thickness of film (μm) | ty/tx ratio | corrosion condition |
|---|---|---|---|---|---|---|
| 35 | SUPERLAC DIF, F-80, N-23 (epoxy polyurethan paint) | 30 parts | 190° C./10 sec. | 20 | 260 | Hydrogen sulfide and carbonic acid were continuously blown into 3% NaCl solution. Temp. 50° C. |
| 36 | COPON MASTIC PRIMER (epoxy resin paint) | 30 parts | natural drying 10 days | 60 | 180 | Hydrogen sulfide and carbonic acid were continuously blown into 3% NaCl solution. Temp. 70° C. |
| 37 | EPOTAR S (epoxy coal tar paint) | 30 parts | natural drying 10 days | 70 | 38 | Hydrogen sulfide and carbonic acid were continuously blown into 3% NaCl solution. Temp. 50° C. |
| 38 | Hi-RUBBER E PRIMER (rubber chloride paint) | 30 parts | natural drying 10 days | 40 | 23 | Hydrogen sulfide and carbonic acid were continuously blown into 3% NaCl solution. Temp. 30° C. |
| 39 | SULPHOTITE 10 (phenol resin paint) | 30 parts | natural drying 10 days | 25 | 232 | Hydrogen sulfide gas of 100% relative humidity. Temp. 70° C. |
| 40 | SUNFTAL 20 JIS K-5572 (phthalic acid paint) | 30 parts | natural drying 10 days | 25 | 43 | Hydrogen sulfide gas of 100% relative humidity. Temp. 70° C. |
| 41 | ORGA 100-2 (melamine resin paint) | 30 parts | natural drying 10 days | 20 | 29 | Hydrogen sulfide gas of 100% relative humidity. Temp. 30° C. |
| 42 | CYANAMID HELGON QD PRIMER (JIS K5625-2) | 30 parts | natural drying 10 days | 35 | 31 | Hydrogen sulfide and carbonic acid were continuously blown into 3% NaCl solution. Temp. 30° C. |
| 43 | INTERGARD GLASS FLAKE (epoxy resin paint) | 30 parts | natural drying 10 days | 2000 | 18 | Hydrogen sulfide was continuously blown into 3% NaCl solution. Temp. 60° C. |
| 44 | NIPPE ZINKY 1000P (zinc powder containing paint) | 30 parts | natural drying 10 days | 20 | 21 | Hydrogen sulfide was continuously blown into 3% NaCl solution. Temp. 20° C. |
| 45 | Hi-CR PRIMER WHITE (JIS K-5506) (synthetic resin paint) | 30 parts | natural drying 10 days | 20 | 98 | Hydrogen sulfide was continuously blown into 3% NaCl solution. Temp. 50° C. |
| 46 | POWDAX P (powder coating) | 30 parts | 180° C./30 min. | 100 | 22 | Hydrogen sulfide and carbonic acid were continuously blown into 3% NaCl solution. Temp. 70° C. |
| 47 | Hi-CR PRIMER WHITE (JIS K-5506) (synthetic resin paint) | 1 parts | natural drying more than 10 days | 10 | 42 | Hydrogen sulfide was continuously blown into 3% NaCl solution. Temp. 40° C. |
| 48 | Hi-CR PRIMER WHITE (JIS K-5506) (synthetic resin paint) | 10 parts | natural drying more than 10 days | 10 | 210 | Hydrogen sulfide was continuously blown into 3% NaCl solution. Temp. 40° C. |
| 49 | Hi-CR PRIMER WHITE (JIS K-5506) (synthetic resin paint) | 100 parts | natural drying more than 10 days | 10 | 45 | Hydrogen sulfide of 100% relative humidity. Temp. 60° C. |
| 50 | Hi-CR PRIMER WHITE (JIS K-5506) (synthetic resin paint) | 500 parts | natural drying more than 10 days | 10 | 19 | Hydrogen sulfide gas of 100% relative humidity. Temp. 60° C. |
| Comparative Example 5 | Hi-CR PRIMER WHITE (JIS K-5506) (synthetic resin paint) | 0.1 parts | natural drying more than 10 days | 10 | 4 | Hydrogen sulfide gas of 100% relative humidity. Temp. 60° C. |
| Comparative Example 6 | Hi-CR PRIMER WHITE (JIS K-5506) (synthetic resin paint) | 1000 parts | natural drying more than 10 days | 10 | 3 | Hydrogen sulfide gas of 100% relative humidity. Temp. 60° C. |

Since this measurement is conducted by an electrochemical method, it is 100 times more sensitive than a conventional gas measurement. Accordingly, the measuring time of ty is stopped at 3,000 hours, ty is regarded as 3,000 unless the ty point exists.

In Table 3, ty/tx of Example 43 was as small as 18, Example 43, however, was seemingly small, because it was a thick coating type (a kind of lining) which made ty more than 3,000 hours. Accordingly it seems that the technical effect is more than 18 times greater when molybdenum trioxide is present in the paint.

EXAMPLE IV

This example indicates that the coating composition of the present invention holds the potential of the steel surface noble by measuring a corrosion potential on the side of the coating.

One hundred parts by weight of melamine alkyd resin was mixed with 10 parts of a metal oxide of the present invention (Y-1), 10 parts of titanium oxide(X-1) and 10 parts of iron oxide red(X-2) to form a paint. The paint was applied to the cold rolled steel as described in Example 1. A saturated solution of 3% $NaCl+H_2S$(gas) was contacted with the coated film. A silver-silver chloride reference electrode was put into the saturated solution through a salt bridge. The corrosion potential of the steel is measured on a basis of the silver-silver chloride electrode. The result is shown in FIG. 2.

Figure 2:
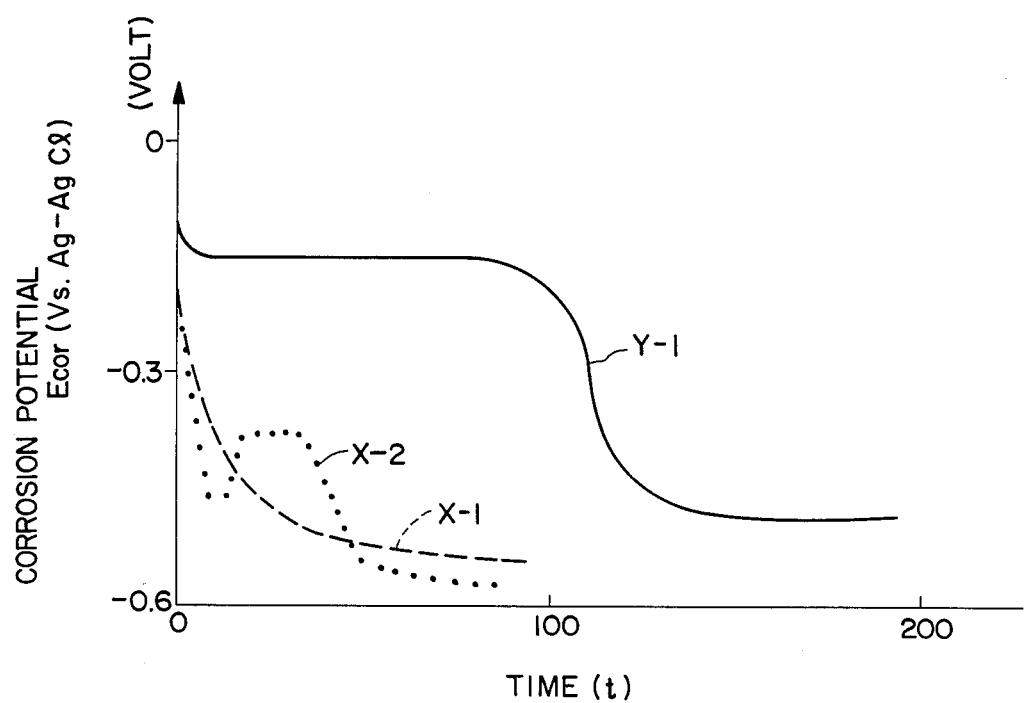
FIG. 2 shows change with time of corrosion potential of the coated side of steel.

As indicated in FIG. 2, when the paint did not contain the metal oxide of the present invention or when the paint contained the substance which can react with hydrogen sulfide, the corrosion potential of the steel was not kept noble and changed to less-noble with time. On the other hand, when the paint prepared according to the present invention was used, the corrosion potential was held noble to control hydrogen absorption by an electrochemical reaction.

EXAMPLE V

This example illustrates the reactivity between various oxides and $H_2S$.

A particular amount of $V_2O_5$ was put in a petri dish and placed in an atmosphere containing a $H_2S$ gas saturated with water, for 500 hours. The saturated $H_2S$ gas was introduced by blowing $H_2S$ gas into water at 30° C. and collecting the bubbled gas. The reacted $V_2O_5$ with $H_2S$ was then dried in vacuum and weighed. The weight increase was obtained in terms of percentage by weight and shown in Table 4 hereinafter.

$MoO_3$, electrolytic $MnO_2$, $\beta$-$MnO_2$ and $TiO_2$ were treated as mentioned above and the results are shown in Table 4.

EXAMPLE VI

This example illustrates the change of corrosion potential (Ecorr.) in respect to a steel panel coated with an agar gel containing the oxides mentioned in Example V.

Figure 3:
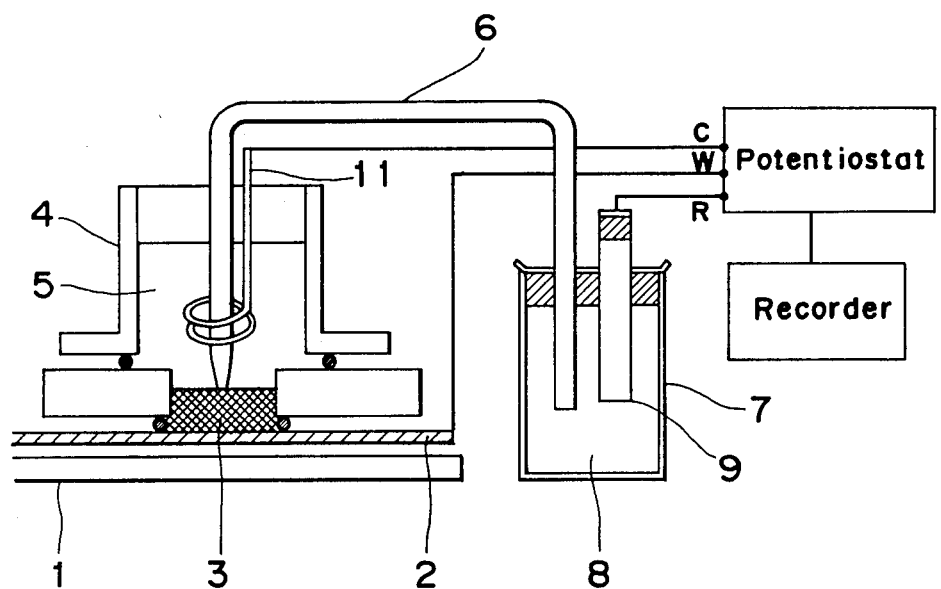
FIG. 3 shows an apparatus used to measure the change of corrosion potential of a steel plate coated with a gel containing oxides.

The measurement was carried out using an apparatus shown in FIG. 3. In FIG. 3, a steel panel 2 was positioned on a substrate 1 and an agar gel containing $V_2O_5$ at 5% by weight was coated on the steel panel 2 to form an agar layer 3. A 3% NaCl solution 5 was poured in an electrolysis cell 4 as a typical corrosion condition to allow to polarization. The agar gel 3 was connected to an Ag-AgCl reference electrode 9 immersed in 3.33N KCl solution 8 in a glass container 7 through a salt bridge (3.33N solution gelled with agar) in a rugin tube 6. The Ag-AgCl reference electrode 9 was connected to a potentiostat. The steel panel 2 was also connected to the potentiostat, of which a C terminal was connected to a Pt counter-electrode 11 around the rugin tube 6. Corrosion potential (Ecorr.) before and after blowing an $H_2S$ was measured by a polarization curve method. The $H_2S$ gas was continuously blown into the NaCl solution 5 at 25° C. for one day. The same test were applied to $MoO_3$, electrolytic $MnO_2$, $\beta$-$MnO_2$ and $TiO_2$. The result was shown in Table 4.

TABLE 4

| metal oxides | Weight increase | Ecorr. (mV) Before $H_2S$ blow | Ecorr. (mV) After $H_2S$ blow | Difference |
| --- | --- | --- | --- | --- |
| $V_2O_5$ | +5% | −615 | −610 | +5 |
| $MoO_3$ | +12 | −620 | −610 | +10 |
| EMD (electrolytic MnO) | +30 | −590 | −700 | −110 |
| $\beta MnO_2$ | +25 | −620 | −690 | −70 |
| $TiO_2$ | +1 | −640 | −660 | −20 |

As appears from Table 4, $V_2O_5$ and $MoO_3$ have less weight increase in Example V and maintain noble corrosion potential after finishing the reaction with $H_2S$ in Example VI.

EXAMPLE VII

This example shows how the metal oxide of the present invention provides the capability of maintaining noble Ecorr. in the presence of $H_2S$.

A melamine alkyd coating composition was formulated with $\beta$-$MnO_2$, $V_2O_5$ and $MoO_3$, respectively, in an amount of 50 parts by weight based on 100 parts by weight of resin solids to form three compositions. The compositions were applied to steel panels in a thickness of 30 to 35 $\mu$m and were baked for 30 minutes at 140° C. The corrosion potential was measured using the apparatus mentioned in Example VI. $H_2S$ gas was continuously blown into the three NaCl solutions 5 at 40° C. The result is shown in FIG. 4.

Figure 4:
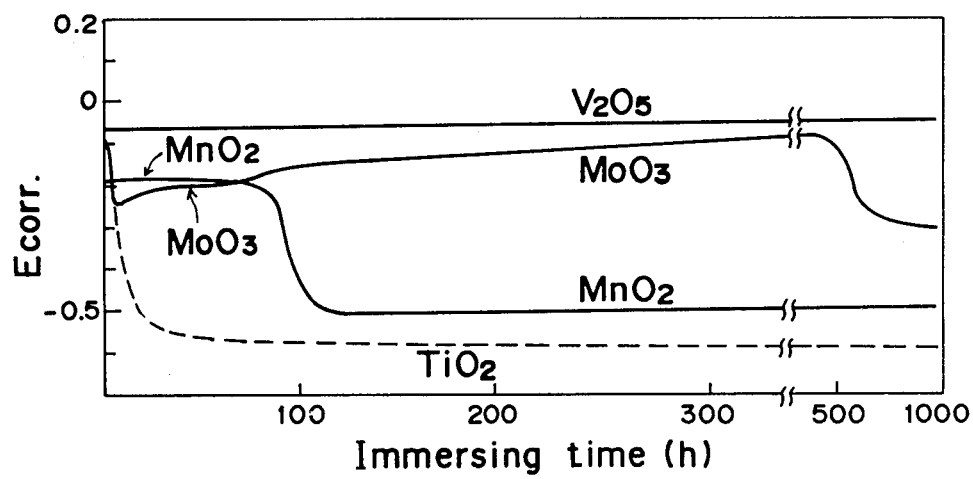
FIG. 4 shows the change in corrosion potential vs. immersion time for a steel panel coated with a composition of the present invention.

As apparent from FIG. 4, corrosion potential is maintained noble with $V_2O_5$ and $MoO_3$, but not with $MnO_2$. It is indicated that $MnO_2$ is rapidly changed by reacting with $H_2S$.

EXAMPLE VIII

Coating compositions were made and coated on steel panels as generally described in Example VII. Reaction current to extract the permeated hydrogen was measured as generally described in Example 1. The result is shown in FIG. 5.

Figure 5:
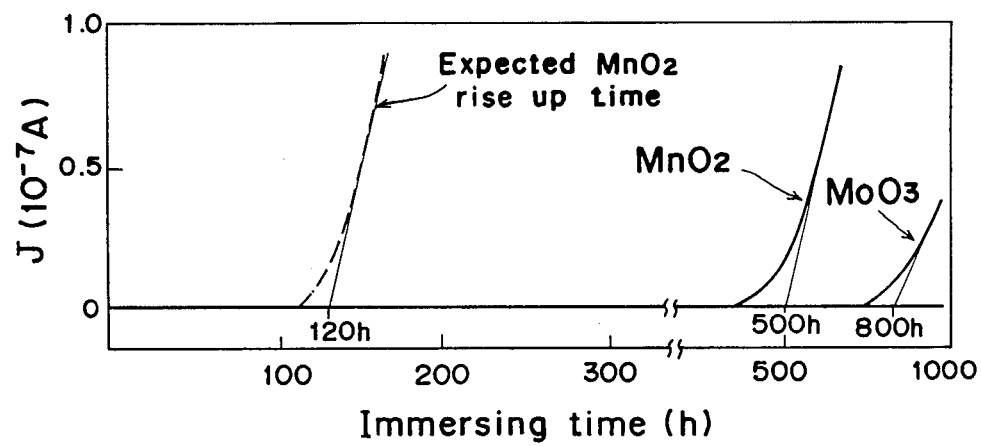
FIG. 5 shows the change in reaction current vs. immersion time for the metal oxide coating on a steel panel, in accordance with the present invention.

As apparent from FIG. 5, the rise up time of the reaction current curve for $MoO_3$ and $V_2O_5$ is longer than that of $MnO_2$. Though the rise up time of the reaction current curve of $MnO_2$ does not correspond to the shift to be less noble of corrosion potential, it can be understood as follows: $MnO_2$ prevents absorption of hydrogen by a similar mechanism to $MoO_3$ and $V_2O_5$ up to 100 hours and after 100 hours the control of hydrogen absorption is probably carried out by a different mechanism which has been unknown. This mechanism does not work sufficiently after 500 hours. It has thus been found that $MoO_3$ and $V_2O_5$ are superior to $MnO_2$.

What is claimed is:

1. A method for controlling hydrogen absorption of steel which consists essentially of directly coating the surface of said steel with a composition containing resin solids and a metal oxide, with said metal oxide being selected from the group consisting of vanadium pentoxide and molybdenum trioxide and being employed at 1 to 500 percent by weight, based on 100 percent by weight of said resin solids.

* * * * *